United States Patent
Rayaroth Koderi et al.

(10) Patent No.: US 11,068,488 B2
(45) Date of Patent: Jul. 20, 2021

(54) EFFICIENT TIME BASED CORRELATION OF DATA STREAMS

(71) Applicant: Cisco Technology, Inc., San Jose, CA (US)

(72) Inventors: Joshith Rayaroth Koderi, San Jose, CA (US); Manickavasagan Jayaraman, Santa Clara, CA (US); Ateet Kumar K. Shetty, Milpitas, CA (US)

(73) Assignee: Cisco Technology, Inc., San Jose, CA (US)

(*) Notice: Subject to any disclaimer, the term of this patent is extended or adjusted under 35 U.S.C. 154(b) by 261 days.

(21) Appl. No.: 16/158,057

(22) Filed: Oct. 11, 2018

(65) Prior Publication Data
US 2020/0012737 A1   Jan. 9, 2020

Related U.S. Application Data

(60) Provisional application No. 62/694,403, filed on Jul. 5, 2018.

(51) Int. Cl.
*G06F 16/2455* (2019.01)
*G06F 16/22* (2019.01)

(52) U.S. Cl.
CPC .... *G06F 16/24568* (2019.01); *G06F 16/2255* (2019.01); *G06F 16/24554* (2019.01)

(58) Field of Classification Search
CPC .................. G06F 16/24568; G06F 16/2255
See application file for complete search history.

(56) References Cited

U.S. PATENT DOCUMENTS

| | | | |
|---|---|---|---|
| 5,864,554 | A | 1/1999 | Rostoker et al. |
| 7,359,837 | B2 | 4/2008 | Drew |
| 2008/0107396 | A1 | 5/2008 | Chung et al. |
| 2011/0131198 | A1 | 6/2011 | Johnson et al. |
| 2012/0066759 | A1 | 3/2012 | Chen et al. |
| 2017/0034057 | A1 | 2/2017 | Kapadia et al. |

(Continued)

FOREIGN PATENT DOCUMENTS

| | | |
|---|---|---|
| WO | 2006048719 A1 | 5/2006 |
| WO | 2017196642 A1 | 11/2017 |

OTHER PUBLICATIONS

PCT Notification of the International Search Report and the Written Opinion of the International Searching Authority, or the Declaration for Application No. PCT/US2019/040431 dated Oct. 30, 2019.

(Continued)

*Primary Examiner* — Hau H Hoang
(74) *Attorney, Agent, or Firm* — Patterson + Sheridan, LLP

(57) ABSTRACT

Techniques for efficient data correlation are provided. A first data partition is received, and a first hash table of a plurality of hash tables is selected based on a timestamp associated with the first data partition. Additionally, a first hash bucket in the first hash table is identified based on the first data partition. It is determined that the first hash bucket includes a second data partition. Upon determining that the first hash bucket satisfies a predefined criterion, the second data partition is removed from the first hash bucket, and the first and second data partitions are associated.

19 Claims, 11 Drawing Sheets

(56) References Cited

U.S. PATENT DOCUMENTS

2017/0177636 A1\* 6/2017 Nguyen .............. G06F 16/2477

OTHER PUBLICATIONS

Blazej Lewcio et al: uA testbed for QoE-based multimedia streaming optimization in heterogeneous wireless networks 11Signal Processing and Commun I Ca Ti On Systems (ICSPCS), 2011 5th International Conference on, IEEE, Dec. 12, 2011 (Abstract Only).
Apache Flink-Stateful Computations over Data Streams, [Accessed Online Oct. 15, 2018] https://flink.apache.org/, 2 pages.
Apache Spark-Lighting-Fast unified analytics engine [Accessed Online Oct. 15, 2018] https://spark.apache.org/, 5 pages.
Thu Zebo and Chen Jian, "A new method of processing high-rate rocket telemetry data," 3rd International Conference on Materials Engineering, Manufacturing Technology and Control (2016), 4 pages.
Yanhu Shan et al., "An Enhanced Run-Length Encoding Compression Method for Telemetry Data," Metrol. Meas. Syst., vol. 24 (2017), No. 3, pp. 551-562.
Amergint Technologies, "Time-Data Correlation of Serial Data Streams." 2015, 4 pages.
Hubbard et al., "Using a Network Ring Buffer for Science and Outreach," 2005 ACM 1073-0516/01/0300-0034, 10 pages.
Eugene Stow, Thanassis Tiropanis, Xin Wang, and Wendy Hall, "TritanDB: Time-series Rapid Internet of Things Analytics," arXiv:1801.07947v1 [cs.DB] Jan. 24, 2018, 38 pages.
PCT International Preliminary Report on Patentability for Application No. PCT/US2019/040431 dated Jan. 5, 2021.

\* cited by examiner

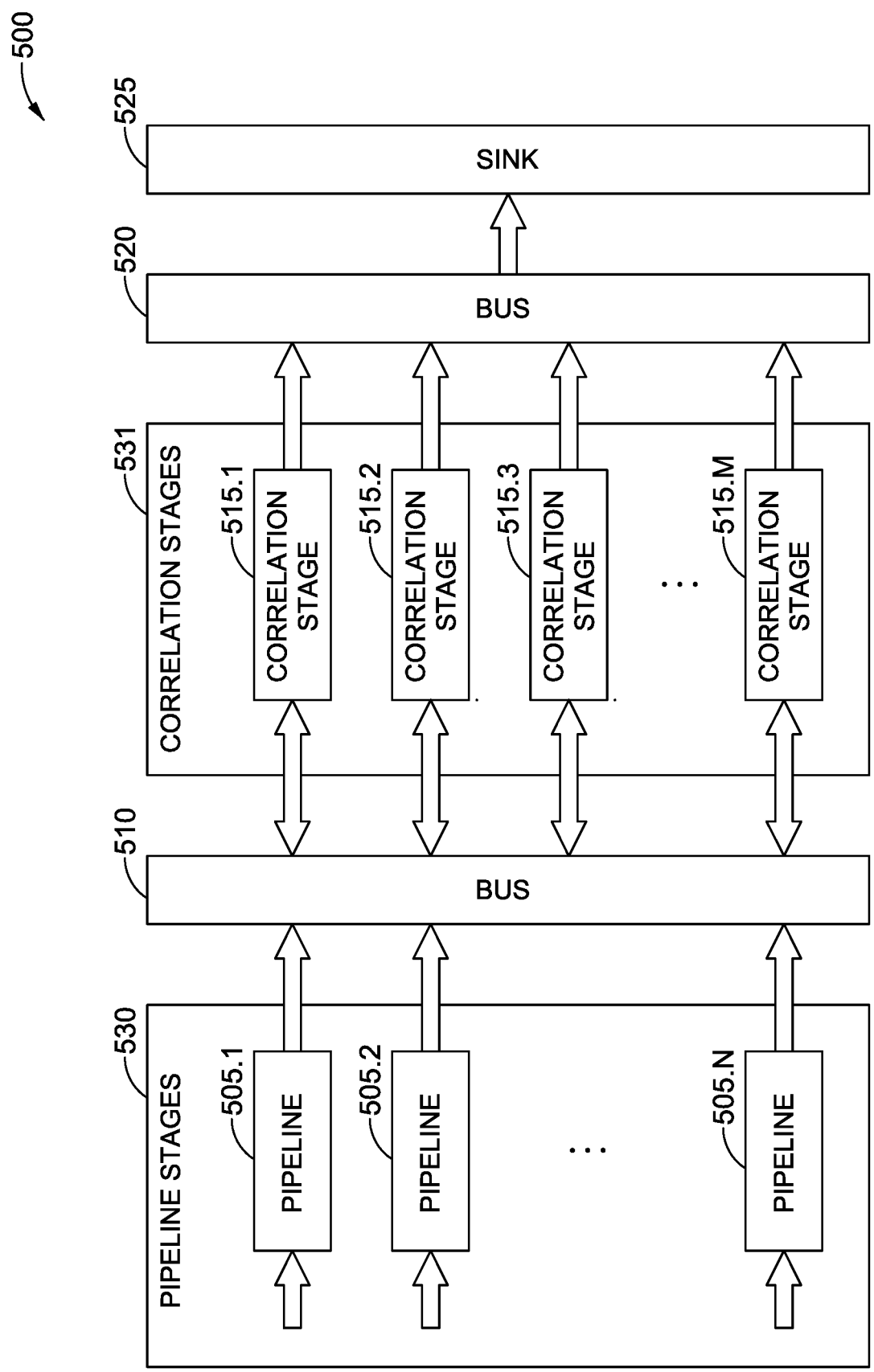

EFFICIENT TIME BASED CORRELATION OF DATA STREAMS

CROSS-REFERENCE TO RELATED APPLICATIONS

This application claims benefit of U.S. provisional patent application Ser. No. 62/694,403, filed Jul. 5, 2018. The aforementioned related patent application is herein incorporated by reference in its entirety.

TECHNICAL FIELD

Embodiments presented in this disclosure generally relate to time-based correlation of data. More specifically, embodiments disclosed herein involve techniques for correlating disparate data sources in an efficient and scalable manner.

BACKGROUND

Data streams can come from a variety of sources, and are increasingly used today for a variety of processes. For example, telemetry data is often streamed in order to provide constant (or near-constant) monitoring. Such telemetry data can include data for monitoring any number of data sources, such as network telemetry, vehicle or device telemetry, weather telemetry, and the like. Data streams can include a tremendous amount of data, and the nature of the stream often means that the data is received relatively continuously, with limited (or with no) interruption. Efficient techniques are therefore required to process this data, in order to ensure monitoring of the data stream continues without delay or interruption. Such delay or interruption may cause significant problems, depending on the particular data stream. Further, in many embodiments, data streams are received from a variety of disparate sources, and the data must be correlated or aligned in order to facilitate analysis of the data. Unfortunately, existing solutions require significant resources and do not operate sufficiently quickly to enable real-time monitoring of larger data streams.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5 is a block diagram of a cluster of correlation engines, according to one embodiment disclosed herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
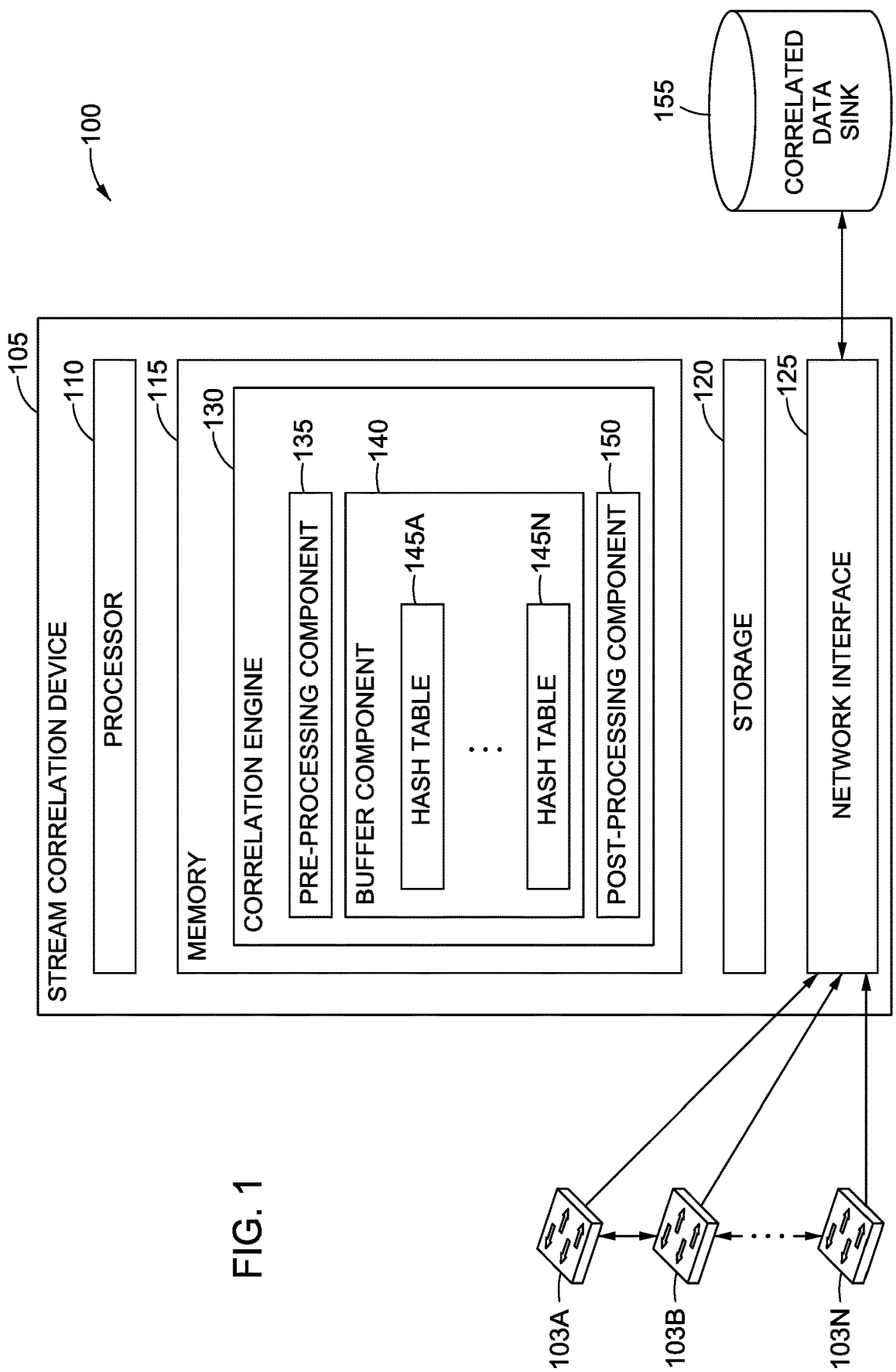
FIG. 1 is a block diagram illustrating a system for correlating data streams, according to one embodiment disclosed herein.

According to one embodiment presented in this disclosure, a method is provided. The method includes receiving a first data record of a plurality of data records in a data stream. The method further includes selecting a first element in a ring buffer based on a timestamp of the first data record, wherein the ring buffer comprises a plurality of elements, each corresponding to a respective window of time. Additionally, the method includes identifying a first hash table associated with the first element in the ring buffer. The method also includes generating a first hash value based on the first data record, and determining that a second data record is associated with the first hash value in the first hash table. Further, the method includes removing the second data record from the first hash table, linking the first and second data records, and transmitting the linked first and second data records to a downstream operator.

According to a second embodiment presented in this disclosure, a computer program product is provided. The computer program product includes a computer-readable storage medium having computer-readable program code embodied therewith, the computer-readable program code executable by one or more computer processors to perform an operation. The operation includes receiving a first data partition, and selecting a first hash table of a plurality of hash tables, based on a timestamp associated with the first data partition. Additionally, the operation includes identifying a first hash bucket in the first hash table based on the first data partition, and determining that the first hash bucket includes a second data partition. Further, upon determining that the first hash bucket satisfies a predefined criterion, the operation includes removing the second data partition from the first hash bucket, and associating the first and second data partitions.

According to a third embodiment presented in this disclosure, a system is provided. The system includes one or more computer processors, and a memory containing a program which when executed by the one or more computer processors performs an operation. The operation includes receiving a first data partition, and selecting a first hash table of a plurality of hash tables, based on a timestamp associated with the first data partition. Additionally, the operation includes identifying a first hash bucket in the first hash table based on the first data partition, and determining that the first hash bucket includes a second data partition. Further, upon determining that the first hash bucket satisfies a predefined criterion, the operation includes removing the second data partition from the first hash bucket, and associating the first and second data partitions.

Example Embodiments

New generation network devices are capable of exporting various telemetry data through software (i.e., software telemetry) and hardware (i.e., hardware telemetry) sensors. In an embodiment, telemetry data coming from multiple sensors and switches (or other devices) must be correlated and aligned in real time in order to ensure meaningful insights. However, when it comes to hardware telemetry data (such as Flow-Telemetry, Streaming Statistics, etc.), the data rate can be very high (greater than one million flows per second). This demands highly efficient techniques for ingestion and processing. In portions of the present disclosure, network telemetry is used as an illustrative example. As understood by one of ordinary skill in the art, however, embodiments of the present disclosure can readily be applied to any data stream embodiment (such as in various embedded devices), or any implementation that requires correlation of data sources.

Existing time based stream correlation engines do not provide sufficient efficiency, which means they are not able to sustain the real-time correlation of data, particularly when the data rate increases. This causes delays, which can severely impact processing and monitoring efforts. Further, existing processing engines are computationally expensive, limiting horizontal scale with micro-service architecture. Embodiments of the present disclosure enable efficient correlation of flow telemetry (FT) data, including data collected from hardware, application-specific integrated circuits (ASICs), forwarding engines in network nodes, and the like. Additionally, embodiments of the present disclosure enable efficient correlation of streaming buffer statistics (SSX) data, which may be exported by hardware, ASICs, forwarding engines, and the like.

Embodiments of the present disclosure provide efficient algorithms and techniques for the real-time correlation of high rate data stream data, such as network telemetry data. The embodiments disclosed herein are lightweight in terms of resource requirements, which enables horizontal scale and multi-stage deployment models. Further, embodiments of the present disclosure provide O(1) efficiency, making the implementations far less sensitive to data-rate variations. Advantages of the present disclosure include better algorithmic efficiency in terms of space complexity and time complexity, very low memory footprint compared to existing systems, high horizontal and vertical scalability for large use cases, and suitability for real-time correlation of heavy rate and time-sensitive data coming from arrays of sensors or data sources.

In one embodiment of the present disclosure, these advantages are realized by use of one or more ring buffers (also referred to as a time wheel, circular buffer, and the like) to correlate data stream data. In an embodiment, each piece of data is slotted into the appropriate element on the ring buffer based on the timestamp associated with the data (e.g., a timestamp of a corresponding event, or a timestamp at which the data was recorded or sensed). Further, in one embodiment, the data is stored and correlated based on using corresponding metadata to build correlation logic, as discussed in more detail below. Although embodiments herein are discussed in relation to a ring buffer, in various embodiments, any buffer structure can be utilized, including queues, linear buffers, and the like. Further, although ring buffers are discussed, in embodiments, the buffer may occupy a linear memory, and each end of the buffer may be marked or flagged such that the read and write pointers can wrap back to the beginning of the buffer, upon reaching either end. Additionally, in embodiments, each element or block of data in the ring buffer need not necessarily be stored in contiguous blocks of memory, and may be stored with unrelated data between or among the sections of memory associated with the ring buffer.

In an embodiment of the present disclosure, a ring buffer is created, where each slot in the ring buffer is associated with a respective hash table, and where each slot corresponds to a window of time. Data is received and partitioned. For each data partition, a slot in the ring buffer is selected based on a timestamp associated with the data partition. The hash table corresponding to the identified slot is searched to identify a match to the data partition. If a match is found, the data is removed from the table, and the two partitions are associated with each other. If no match is found, the partition is stored in the hash table.

FIG. 1 is a block diagram illustrating a system 100 for correlating data streams, according to one embodiment disclosed herein. As illustrated, the system 100 includes a Stream Correlation Device 105, a number of Data Sources 103A-N, and a Correlated Data Sink 155. In the illustrated embodiment, the Data Sources 103A-N are network devices, such as routers, switches, and the like, and the data streams to be correlated include network telemetry. Of course, in various embodiments, the Stream Correlation Device 105 can be used to process and correlate any type of data from any type of data stream from any type of sensor or device. Further, although a single Correlated Data Sink 155 is illustrated, in embodiments, any number of sinks may be utilized. Similarly, although the Correlated Data Sink 155 is illustrated as a database, in embodiments, the Correlated Data Sink 155 may include one or more programs or applications, devices, and the like, based on the particular implementation.

In the illustrated embodiment, the Stream Correlation Device 105 generally receives data (such as in one or more data streams), and correlates the data based on a timestamp of the data, metadata associated with the data, and/or the content of the data. In embodiments, the particular function utilized to correlate the data may differ based on the type of data being correlated, as well as the desired correlation. In one embodiment, a user or administrator may define the correlation function based on the particular implementation and desired results. Although illustrated as a single device, in embodiments, the Stream Correlation Device 105 may operate as a distributed system across one or more devices. Similarly, in embodiments, the operations of the Stream Correlation Device 105 may be performed in a virtual environment (such as in one or more logical partitions or virtual machines). Further, in embodiments, multiple Stream Correlation Devices 105 may operate in a cluster or group to distribute the incoming workload or provide differing correlations, as discussed in more detail below.

In the illustrated embodiment, the Stream Correlation Device 105 includes a Processor 110, a Memory 115, Storage 120, and a Network Interface 125. In the illustrated embodiment, Processor 110 retrieves and executes programming instructions stored in Memory 115 as well as stores and retrieves application data residing in Storage 120. Processor 110 is representative of a single CPU, multiple CPUs, a single CPU having multiple processing cores, and the like. Memory 115 is generally included to be representative of a random access memory. Storage 120 may be a disk drive or flash-based storage device, and may include fixed and/or removable storage devices, such as fixed disk drives, removable memory cards, or optical storage, network attached storage (NAS), or storage area-network (SAN). Through the Network Interface 125, the Stream Correlation Device 105 may be communicatively coupled with other devices, including Data Sources 103A-N, Correlated Data Sinks 155, and the like.

As illustrated, the Memory 115 includes a Correlation Engine 130. Although a single Correlation Engine 130 is illustrated, in embodiments, multiple Correlation Engines 130 may operate in sequence or in parallel to perform a multi-stage correlation operation. Further, in some embodiments, Correlation Engines 130 may operate as a cluster or group of engines to distribute processing of incoming data. As illustrated, the Correlation Engine 130 includes a Pre-Processing Component 135, a Buffer Component 140, and a Post-Processing Component 150. Further, in the illustrated embodiment, the Buffer Component 140 includes a number of Hash Tables 145A-N. Although illustrated as discrete components, in embodiments, the operations of the Pre-Processing Component 135, Buffer Component 140, and Post-Processing component 150 may alternatively be combined or divided among one or more other components.

In one embodiment, the Pre-Processing Component 135 receives a stream of data (such as from another Correlation Engine 130, another Stream Correlation Device 105, or from one or more Data Sources 103A-N), and performs pre-processing to facilitate correlation of the data. In one embodiment, the Pre-Processing Component 135 delineates the received data stream into discrete records, packets, portions, fragments, or logical structures. For example, in such an embodiment, if the data stream includes Streaming Statistics (SSX) data, the Pre-Processing Component 135 identifies the defined SSX packets in the data. Further, in some embodiments, the Pre-Processing Component 135 filters the incoming data streams (or identified or defined portions, packets, or records in the data stream) based on predefined criteria. For example, in such an embodiment, an administrator may wish to exclude data from specified devices or interfaces, collected during certain times, relating to certain flows or data, and the like.

Once the data has been pre-processed, the Buffer Component 140 receives the pre-processed data (e.g., delineated portions of the data stream) and buffers the data in order to correlate it. In an embodiment, buffering is used to provide a necessary time-cushion for sensor delay and/or transmission delay from one or more Data Sources 103A-N. In one embodiment, the Buffer Component 140 generates a hash value for each received portion of data, and stores it in one or more Hash Tables 145A-N based on this hash value. In an embodiment, the Buffer Component 140 generates a key for each portion of data based on the content of the portion, or metadata associated with the portion. For example, in one embodiment, the data stream includes flow data relating to network flows. In such an embodiment, the Buffer Component 140 may generate a hash key for each portion of data (e.g., for each flow or packet identified in the flow telemetry), based on the associated 5-tuple (e.g., source IP address, destination IP address, source port, destination port, and protocol). For example, in an embodiment involving correlation of flow telemetry, each portion or record of the flow telemetry may include data about a particular flow or network event, such as ingress or egress of a particular packet. The hash key for each record of telemetry may correspond to one or more of the source and destination IP addresses, source and destination ports, and/or transport protocol of the packet, depending on the particular correlation desired.

Similarly, in an embodiment involving SSX telemetry, the Buffer Component 140 may generate a hash key for each portion of the SSX data based on metadata such as the switch, interface, queue, and the like that is associated with the portion of data (e.g., the switch, interface, and/or queue that the portion of data relates or describes). Further, in embodiments, different types of data (e.g., flow telemetry and SSX data) can be correlated by selecting a correlation criteria that is meaningful to both data streams, as discussed below in more detail. In embodiments, the particular function used to generate the hash key (e.g., the particular data or metadata used) may depend on the type of data being correlated, as well as the type of correlation desired. In one embodiment, these keys are defined based on user or administrator configuration.

In one embodiment, when a collision is detected in the Hash Table 145A-N, the Buffer Component 140 determines that the received record matches with the record stored in the Hash Table 145A-N, and the records should therefore be correlated and associated with each other. For example, suppose a first record stored in the Hash Table 145A-N corresponds to egress of a packet from a first switch or router, and the newly received record corresponds to ingress of that packet into the next switch or router in the network. In an embodiment, the Buffer Component 140 may pop the record stored in the Hash Table 145A-N and associate or link it with the newly received record. In an embodiment, this correlated data is then transmitted downstream (e.g., to a Correlated Data Sink 155, to another Correlation Engine 130, and/or to another Stream Correlation Device 105).

In one embodiment, in order to provide time-based correlation as well as content-based correlation, the Buffer Component 140 may assign each Hash Table 145A-N to a particular window of time. For example, in one embodiment, the Buffer Component 140 utilizes a ring buffer with N elements, where each element includes a particular Hash Table 145A-N (or a pointer to a particular Hash Table 145A-N). In one embodiment, the number of elements in the ring buffer can be defined by an administrator. In an embodiment, each element in the ring buffer corresponds to a particular window of time (e.g., 100 milliseconds). When the rotation time of the ring buffer has passed, the oldest data may be deleted or overwritten, in order to make room for newer data. For example, suppose the ring buffer includes ten elements, each element spanning one hundred milliseconds. In such an embodiment, the rotation time of the buffer is one second. That is, the end pointer of the ring buffer may point to a time roughly one second in the past, and data older than one second may be discarded, as described in more detail below.

In an embodiment, upon receipt of a record or portion of data, the Buffer Component 140 may determine the timestamp of the record. In embodiments, this may correspond to the time of an event that corresponds to the data record (e.g., ingress or egress of a packet, adding data to a queue, removing data from a queue, receipt of data for processing, completion of processing, triggering of a sensor, a time at which a sensor reading or data value was recorded, and the like). Based on this timestamp, the Buffer Component 140 can identify the corresponding element in the ring buffer, and thereby determine which Hash Table 145A-N to search. In this way, the data is correlated based on the content of the data, within a predefined window of time.

In an embodiment, once a correlation has been identified, the Post-Processing Component 150 receives the correlated data and completes any further operations. For example, in one embodiment, the Post-Processing Component 150 filters the correlated records based on predefined filtration criteria. In another embodiment, the Post-Processing Component 150 compacts or compresses the records, or otherwise prepares them for transmission, storage, and/or processing by downstream entities. The correlated data is then transmitted to the Correlated Data Sink 155.

In embodiments, several configuration options are available to adjust the particular implementation of the Correlation Engine 130. For example, in an embodiment, an administrator may define the amount of time that data should be buffered. Further, in an embodiment, administrators can define the width of each element in the time-wheel (e.g., the amount of time that is included within the window). In an embodiment, larger time-bucket size corresponds to less granularity for correlation. Additionally, in an embodiment, the administrator can define the memory available for the buffers, as well as the rate and amount of data for which correlation is being performed. Further, in embodiments, users or administrators can define the correlation type based on specifying the particular data that is to be used when correlating the data (e.g., the particular data or metadata in each record that is to be used to align the data).

Figure 2:
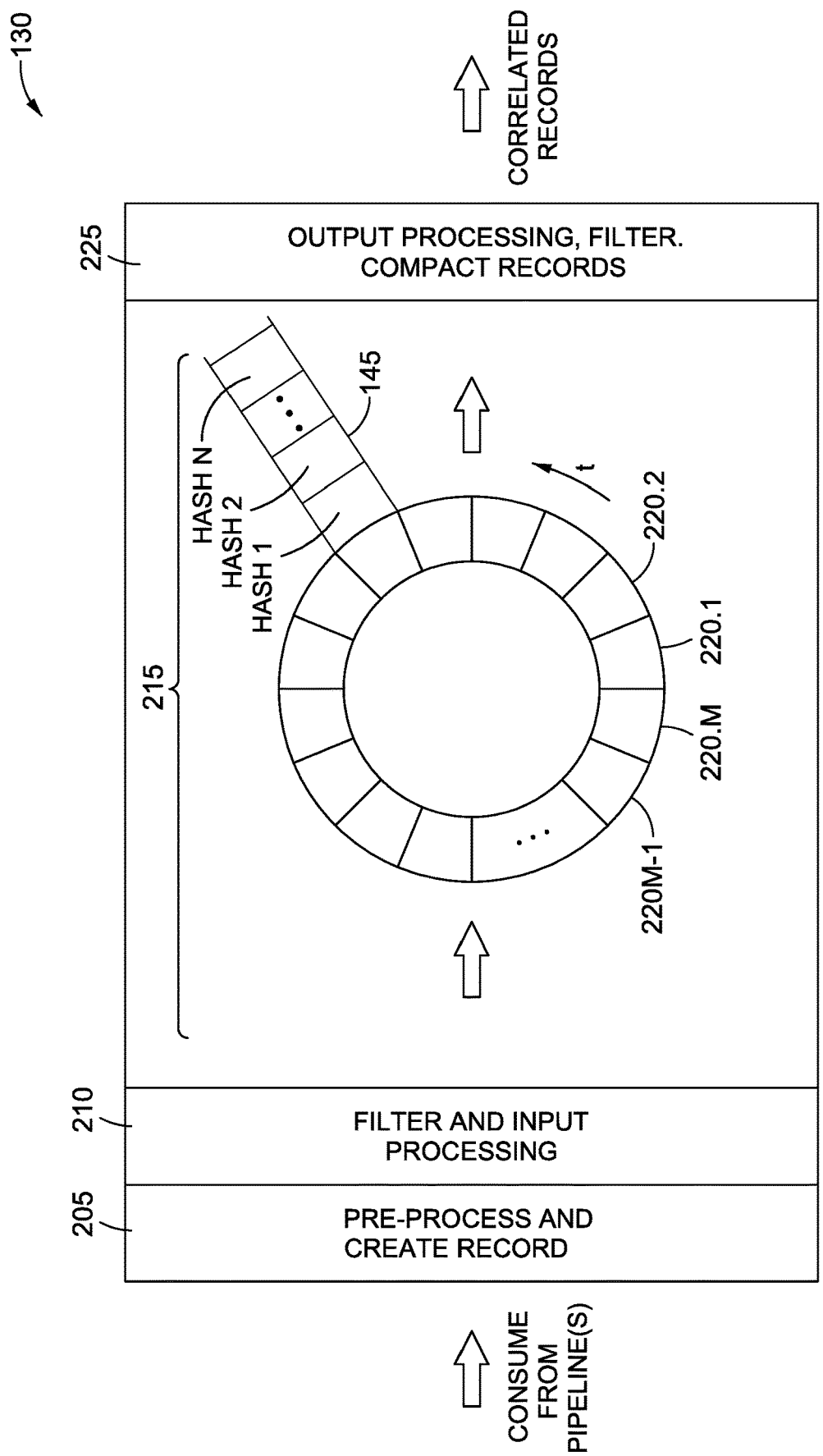
FIG. 2 illustrates a data correlation engine, according to one embodiment disclosed herein.

FIG. 2 illustrates a data Correlation Engine 130, according to one embodiment disclosed herein. In the illustrated embodiment, the Correlation Engine 130 includes a Ring Buffer 215, as well as several blocks 205, 210, and 225 for processing of the data. As illustrated, data is consumed from one or more data pipelines, and at block 205, the data is pre-processed to delineate it into discrete data records. Further, at block 210, any additional filtration and input processing is performed. The data records then proceed to the Ring Buffer 215. As illustrated, the Ring Buffer 215 includes individual Data Elements 220.1, 220.2, . . . 220.M-1, and 220.M. Further, as illustrated by the ellipses, the Ring Buffer 215 can include any number of Data Elements 220, each of which correspond to a respective window of time. In embodiments, the number of Data Elements 220 is defined by a user or administrator. Additionally, in an embodiment, the width of each Data Element 220 (e.g., the amount of time included in it) is also defined by a user or administrator. Further, although a single Hash Table 145 is illustrated for clarity, in embodiments, each Data Element 220 is associated with a respective Hash Table 145, as discussed above. In one embodiment, each respective Data Element 220 includes a pointer to a respective Hash Table 145.

As discussed above, in one embodiment, each Data Element 220 covers a predefined window of time. In the illustrated embodiment, when a data record is received, the Correlation Engine 130 identifies the timestamp of the record, and selects the Data Element 220 that covers the window of time which includes the timestamp. For example, a first data record may correspond to Data Element 220.1, while a subsequent data record corresponds to Data Element 220.2. Note that the data records are not assigned to Data Elements 220 based on when they are received, but based on their timestamps. As such, after placing a record in Data Element 220.2, the next data record may belong in Data Element 220.1, Data Element 220.M-1, or any other element. In an embodiment, once the appropriate Data Element 220 is identified, the Correlation Engine 130 utilizes the hash value of the record (which may be generated based on predefined criteria, as discussed above) to search the Hash Table 145 that corresponds to the identified Data Element 220. If no match is found, in an embodiment, the Correlation Engine 130 inserts the data record into the Hash Table 145 at the location specified by the hash value, and proceeds to the next data record.

As illustrated, the Hash Table 145 is delineated into several entries or buckets. In an embodiment, the particular entry or bucket to which a data record belongs is defined based on the hash value of the data record. For example, in the illustrated embodiment, each entry corresponds to a hash value from "hash1," "hash2," through "hashN." In an embodiment, the number of entries or buckets in each Hash Table 145 is defined by a user or administrator. In embodiments, identifying one or more matching data records for a newly received data record comprises hashing the data record (or some identified portion of it) to determine the appropriate hash bucket, and determining whether the entry already has one or more data records in it. If so, these records are counted as matches for the currently received record.

In an embodiment, if a match is identified in the Hash Table 145, the Correlation Engine 130 removes the matching data record from the Hash Table 145, correlates, associates, or links the two data records (e.g., the record stored in the Hash Table 145, and the record that was newly received and is being processed), and transmits them to block 225 for post-processing. In some embodiments, the correlated data records are included in a combined data structure that refers or points to all of the data records belonging to the particular correlation (e.g., the particular type of correlation, and particular window of time). As illustrated, in block 225, the Correlation Engine 130 can also perform any output processing, filtration, and compacting of the correlated data records that is desired. In one embodiment, upon receipt of each new data record, the Correlation Engine 130 further analyzes the timestamp to determine whether to rotate the buffer. For example, if the timestamp is earlier than the time covered by the earliest Data Element 220 (e.g., the timestamp is less than the current time, minus the total wheel rotation time), the record is immediately discarded. Similarly, if the timestamp is newer than the window included in the most recent Data Element 220, the Correlation Engine 130 rotates the wheel by the width of one Data Element 220, erasing data older than the wheel rotation time (found in the last Data Element 220) and clearing space for a new Hash Table 145, for the newest window of time.

In an embodiment, the rotation of the Ring Buffer 215 is accomplished by moving a begin pointer and an end pointer (also referred to as start and end pointers, or head and tail pointers). In some embodiments, the begin pointer points to the most recent Data Element 220, while the tail data pointer indicates the oldest Data Element 220. For example, upon determining that the Ring Buffer 215 should be rotated, the Correlation Engine 130 may move both pointers to point to their adjacent Data Elements 220. If the Ring Buffer 215 is implemented as a linear series of Data Elements 220, the Correlation Engine 130 may check to see if updated pointer position would place it beyond the end of the buffer. If so, the pointer is placed at the opposite end of the buffer. In this way, the pointer(s) move down the buffer, one Data Element 220 at a time, until looping back to the beginning.

In some embodiments, the Correlation Engine 130 is used to correlate two pieces of data. For example, in one embodiment, data from two sources may be correlated. In such an embodiment, when a match is found, the data is immediately removed from the Ring Buffer 215 and forwarded downstream. In some embodiments, however, the Correlation Engine 130 is configured to correlate three or more pieces of data. For example, if data from three or more sources (e.g., three or more sensors, network devices, etc.) is to be correlated, the Correlation Engine 130 does not immediately pop the data from the Ring Buffer 215 upon identifying a match.

In one embodiment, if a match is identified, the Correlation Engine 130 (e.g., the Buffer Component 140) determines the number of data sources to be correlated, and identifies the number of data items that are associated with the current hash value (e.g., how many data sources have already been identified and correlated). If the number of items of data in the particular bucket of the selected Hash Table 145 (e.g., the number of matches) meets the predefined value, all of these data portions are removed from the Ring Buffer 215 and associated with each other. If the number of data items is below the defined value, however, the new data portion is inserted into the identified location, and the Correlation Engine 130 continues to search for the remaining data.

For example, in a spine-leaf network topology, flow telemetry data may be collected from three nodes (e.g., the ingress leaf, the egress leaf, and the spine). In such an embodiment, the Correlation Engine 130 may refrain from removing data from the Ring Buffer 215 until data has been received from all three nodes. In an embodiment, each time data is inserted into the Hash Table 145, a counter for the particular bucket (e.g., the particular hash value) is incremented. When the target count of flow records have been received (e.g., one from each data source), the data in the identified bucket is popped and sent to the next processing stage as a correlated set of data records. Further, in an embodiment, similar logic exists when flow data is correlated with SSX data from multiple switches, as well as to correlate multiple types of data (such as ingress queue occupancy, egress queue occupancy, ingress queue drop, egress queue drop, etc.) for the same switch. Although flow telemetry and SSX data are used herein as example correlations, embodiments of the present disclosure can be utilized to correlate any type of data, from any number of data sources.

In some embodiments, when the Ring Buffer 215 rotates, any data still remaining in the oldest Data Element 220 is lost. In other embodiments, the Correlation Engine 130 extracts any data remaining, links it as appropriate, and forwards it downstream, prior to overwriting the Data Element 220. For example, suppose a particular implementation requires correlation of data records from three different data sources. If a particular hash bucket has only two such records (e.g., the third record has not yet been received by the Correlation Engine 130), the Correlation Engine 130 may nevertheless link, associate, or otherwise connect these two records and transmit them for further processing. In some embodiments, these incomplete correlations are translated to a different data sink, or for modified or different output processing.

Figure 3:
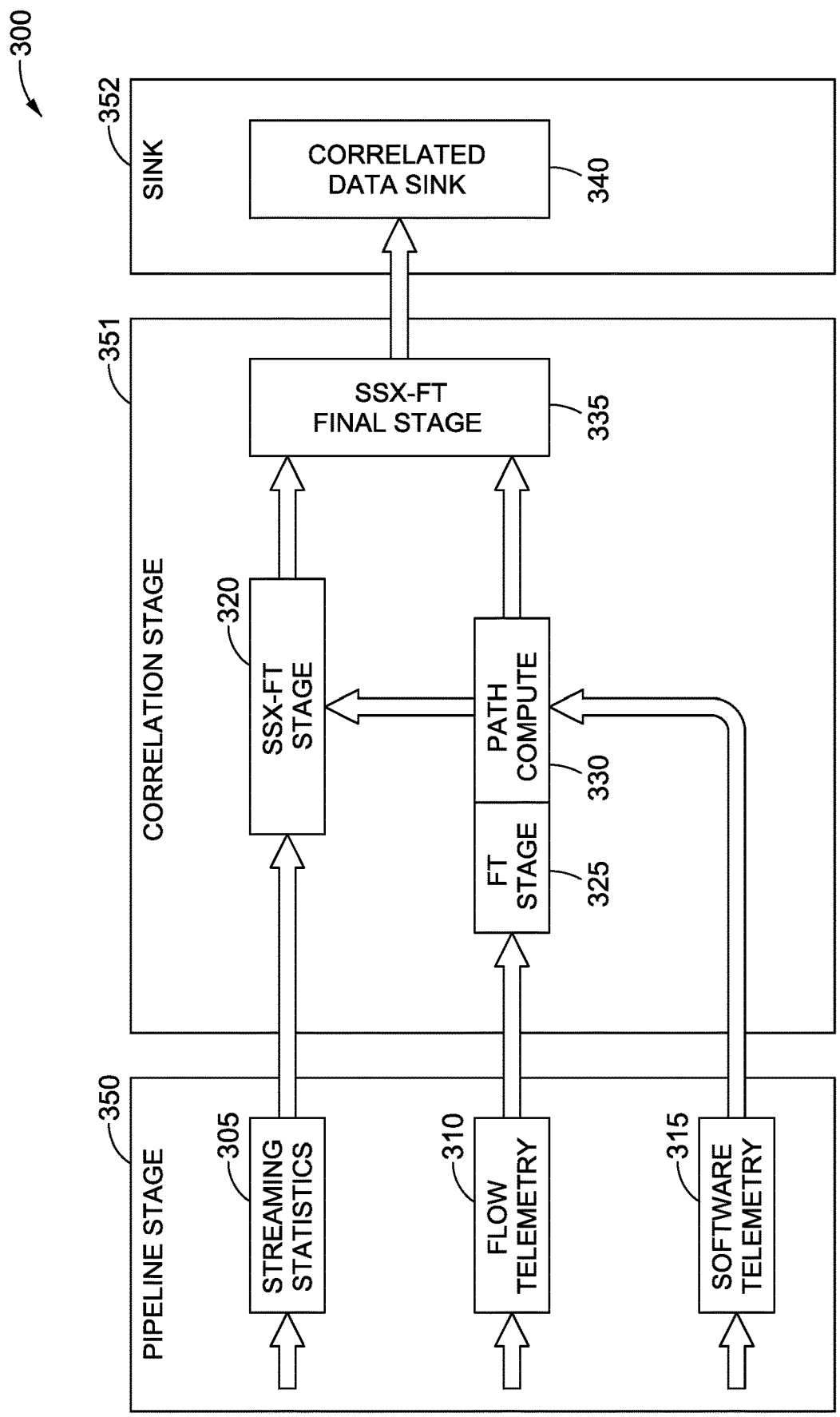
FIG. 3 illustrates a multi-stage correlation system, according to one embodiment disclosed herein.

FIG. 3 illustrates a multi-stage correlation system 300, according to one embodiment disclosed herein. In the illustrated embodiment, independent Correlation Engines 130 work together as a full-featured single node Correlation Engine 300 in the correlation system. As illustrated, each Correlation Engine 130 serves different kinds of input sensors (e.g., different types of data streams). In the illustrated embodiment, the system 300 includes a Pipeline Stage 350, a Correlation Stage 351, and a Sink 352. The Pipeline Stage 350 includes three pipelines, one for each type of data. As illustrated, the Pipeline Stage 300 includes a Streaming Statistics Pipeline 305 for ingestion of SSX data from network devices. Similarly, the Pipeline Stage 300 includes a Flow Telemetry Pipeline 310 for ingestion of flow data from network devices. Further, the Pipeline Stage 350 includes a Software Telemetry Pipeline 315, for ingestion of software telemetry (e.g., information about the network topology, neighboring devices, and the like). The data pipelines included in the system 300 are described for illustration only, and are not intended to be limiting. In embodiments, the configuration of the system 300 can be utilized to enable multi-stage correlation of any data.

In the illustrated embodiment, the Software Telemetry Pipeline 315 feeds into a Correlation Engine 325 designated as an "FT Stage." In an embodiment, the Correlation Engine 325 receives and correlates flow telemetry data, such as ingress and egress events from various devices, as discussed above. In an embodiment, the Correlation Engine 325 correlates the flow data based on the 5-tuples associated with the packets involved, as discussed above. Thus, in the illustrated embodiment, flow telemetry data is received from multiple points (e.g., multiple network devices) in the flow path (e.g., in the network). In embodiments, for each flow, this data is correlated using a Ring Buffer 215. For example, in a leaf-spine topology, data received from the ingress leaf switch, the egress leaf switch, and one or more spine switches). In one embodiment, the Correlation Engine 325 correlates FT data from multiple supporting switches.

Further, as depicted in the illustrated embodiment, when flow data records are correlated, the first stage additionally includes a Path Compute 330 stage. In an embodiment, the Path Compute 330 receives the correlated flow telemetry data from multiple switches or devices, and augments it with the link-level data (such as Link Layer Discovery Protocol (LLDP) data and/or Cisco Discovery Protocol (CDP) data) from switches (including any switches in the path which do not support FT or hardware telemetry, to form the end-to-end flow path for each data packet or flow from source to destination. In one embodiment, this path corresponds to the packet flow within a datacenter. In the illustrated embodiment, this data is received via the Software Telemetry Pipeline 315.

Additionally, in the illustrated embodiment, a second Correlation Engine 320, labeled "SSX-FT Stage," receives SSX data from the Streaming Statistics Pipeline 305, and correlates it with the correlated flow telemetry data from the Correlation Engine 325. For example, in an embodiment, the Correlation Engine 320 correlates the SSX data and flow data based on metadata such as the switch, interface, and/or queue associated with the data. That is, in an embodiment, the hash key used by the Correlation Engine 320 to identify matches in the corresponding ring buffer is based on metadata such as the particular device, interface, queue, port, or other component that is related to the data. For example, in one embodiment, after the ingress event has been correlated with its corresponding egress event (by the Correlation Engine 325), the Correlation Engine 320 identifies SSX data associated with each of these ingress and egress events (e.g., from the devices where the ingress/egress occurred), and associates the data. In this way, the Correlation Engine 320 generates correlation for the flow telemetry and SSX data (e.g., streaming buffer statistics), which provides an accurate state of forwarding queues and buffers in each hop for the flow. In one embodiment, the second stage of correlation provided by the Correlation Engine 320 can be distributed, and the requests may be fed to targeted Correlation Engines 320 based on a routing logic, including hash-based and/or stateful load balancing techniques.

In the illustrated embodiment, the system 300 includes a third stage with a Correlation Engine 335, labeled "SSX-FT Final Stage," which enables multiple correlation engines stages to be combined to form a larger system which distributes load and handles larger scales in terms of numbers switches/routers or number of flows being correlated. For Example, more than one instance of the Correlation Engine 320 can be involved in the correlation of one flow. In one embodiment, each Correlation Engine 320 is designated to correlate flow telemetry to SSX data for a defined set of switches or devices. In such an embodiment, the Correlation Engine 325 will distribute the SSX correlation requests across multiple Correlation Engines 320. All of these Correlation Engines 320 correlation stages will correlate the flow telemetry data based on the requests for the corresponding switches. Thus, in the illustrated embodiment, a final Correlation Engine 335 receives multiple sets of FT to SSX correlated data (each corresponding to one or more devices) from each of the Correlation Engines 320. The Correlation Engine 335 can then correlate or collate the individual correlations to form the final correlated data. In an embodiment, the FT-SSX correlated data coming from second stage (e.g., the Correlation Engine 320) needs to be again mapped to the path-computed FT data coming from first stage (e.g., the Correlation Engine 325 and Path Compute 330). As the second stage (provided by the Correlation Engine 335) may be distributed, in an embodiment, this third stage (Correlation Engine 335) is used to aggregate this data from the second stage and correlate it to the corresponding path-computed FT data.

In an embodiment, this final correlated data is then transmitted to the Correlated Data Sink 340. Thus, as illustrated, embodiments of the present disclosure can be utilized to perform multi-stage correlations. Further, in embodiments, data streams can be correlated based on differing factors at each stage, based on the desired correlation and the nature of the underlying data. Nevertheless, the correlation techniques disclosed herein retain O(1) efficiency, yielding highly efficient correlations. In this way, embodiments of the present disclosure enable a variety of correlation functions and operations, in order to suit the needs of the particular implementation, as understood by one of ordinary skill in the art.

Figure 4A:
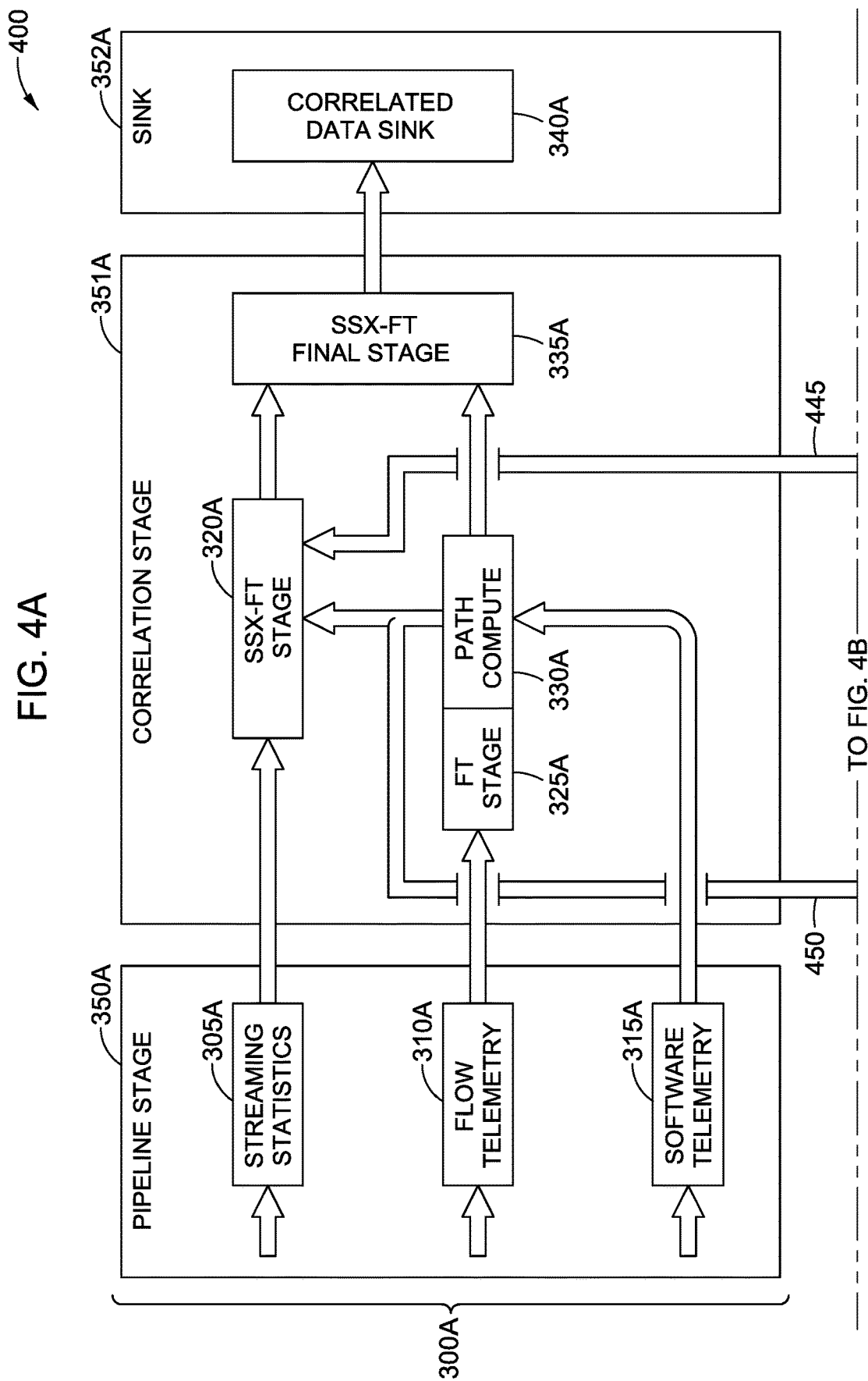
FIGS. 4A-4B illustrate a cluster of multi-stage correlation systems, according to one embodiment disclosed herein.
Figure 4B:
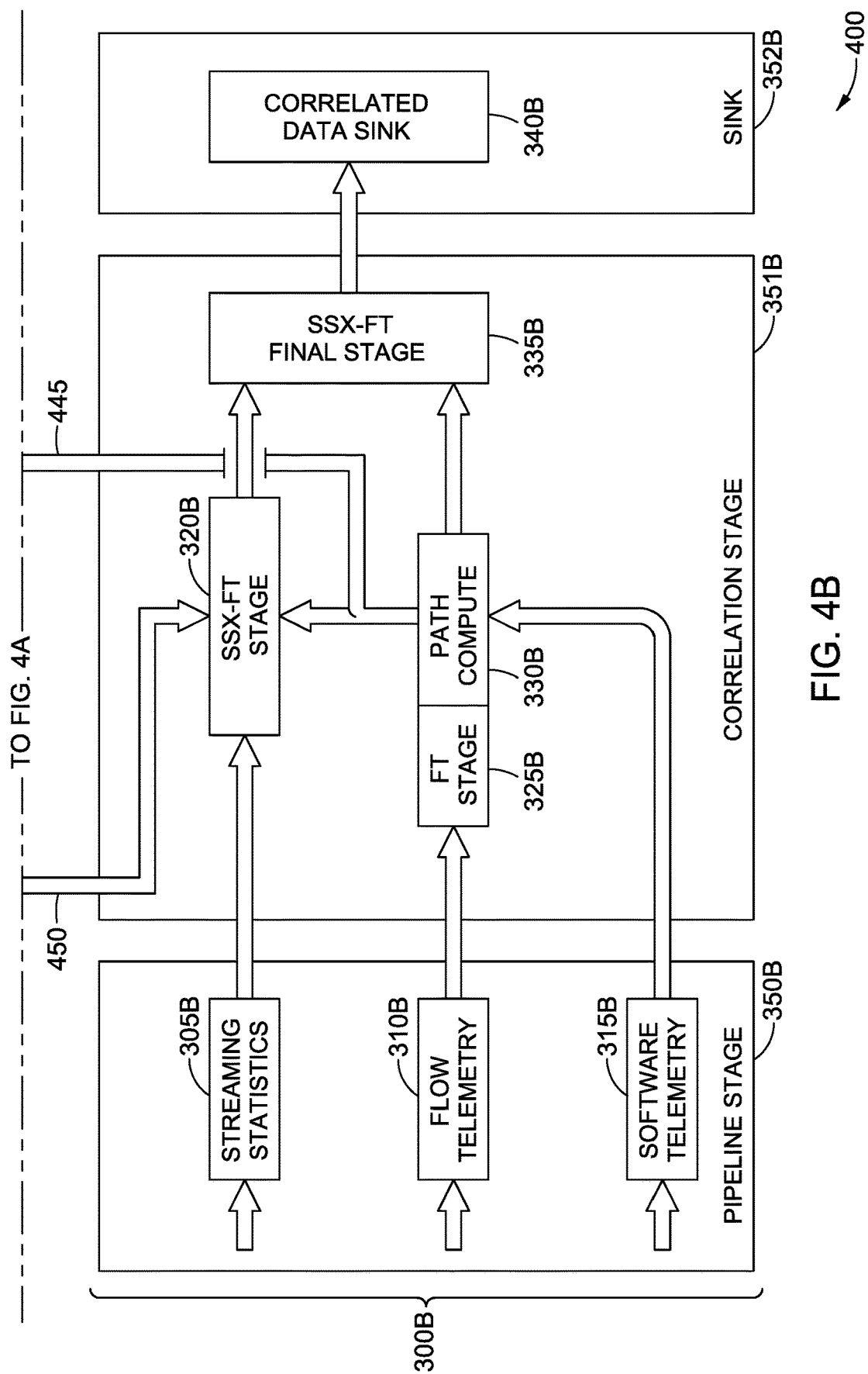

FIGS. 4A-4B illustrate a cluster 400 of multi-stage correlation systems 300, according to one embodiment disclosed herein. The illustrated embodiment includes two multi-stage correlation engines 300A and 300B, as described above with reference to FIG. 3. In the illustrated embodiment, the separate systems 300A-B are configured to interoperate, in order to cluster data across each system. For example, as illustrated by arrow 445, when the flow correlation data is transmitted from the Correlation Engine 425B to the Correlation Engine 420B, the data is also transmitted to the Correlation Engine 420A for correlation with the SSX data received by the system 300A. Similarly, as illustrated by arrow 450, when the flow correlations are transmitted from the Correlation Engine 425A to Correlation Engine 420A, the data is also transmitted to the Correlation Engine 420B for correlation with the SSX data received by the system 300B. In this way, each system shares correlations to ensure accurate results across the cluster.

FIG. 5 is a block diagram of a cluster 500 of correlation engines, according to one embodiment disclosed herein. In the illustrated embodiment, any number of Pipelines 505.1-N in a Pipeline Stage 530 can feed the Correlation Stage 531. Further, as illustrated, the Pipeline Stage 530 may include any number of distinct Correlation Stages 515.1-M. In the illustrated embodiment, data is provided from the Pipeline Stage 530 to the Correlation Stage 531 via a Bus 510. In one embodiment, the data from a particular Pipeline 505 is always provided to a particular identified Correlation Stage 515. In other embodiments, the Correlation Stage 515 is selected dynamically, such as via a hash algorithm, or a load-balancing algorithm.

In the illustrated embodiment, each Correlation Stage 515 includes one or more Correlation Engines 130, each of which includes one or more Ring Buffers 215. In the illustrated embodiment, once each stage has completed its correlation, the data is forwarded across a second Bus 520 to a data Sink 525. In some embodiments, the data may additionally or alternatively be provided to one or more other Correlation Stages 515, as defined by the needs of the particular implementation.

Figure 6:
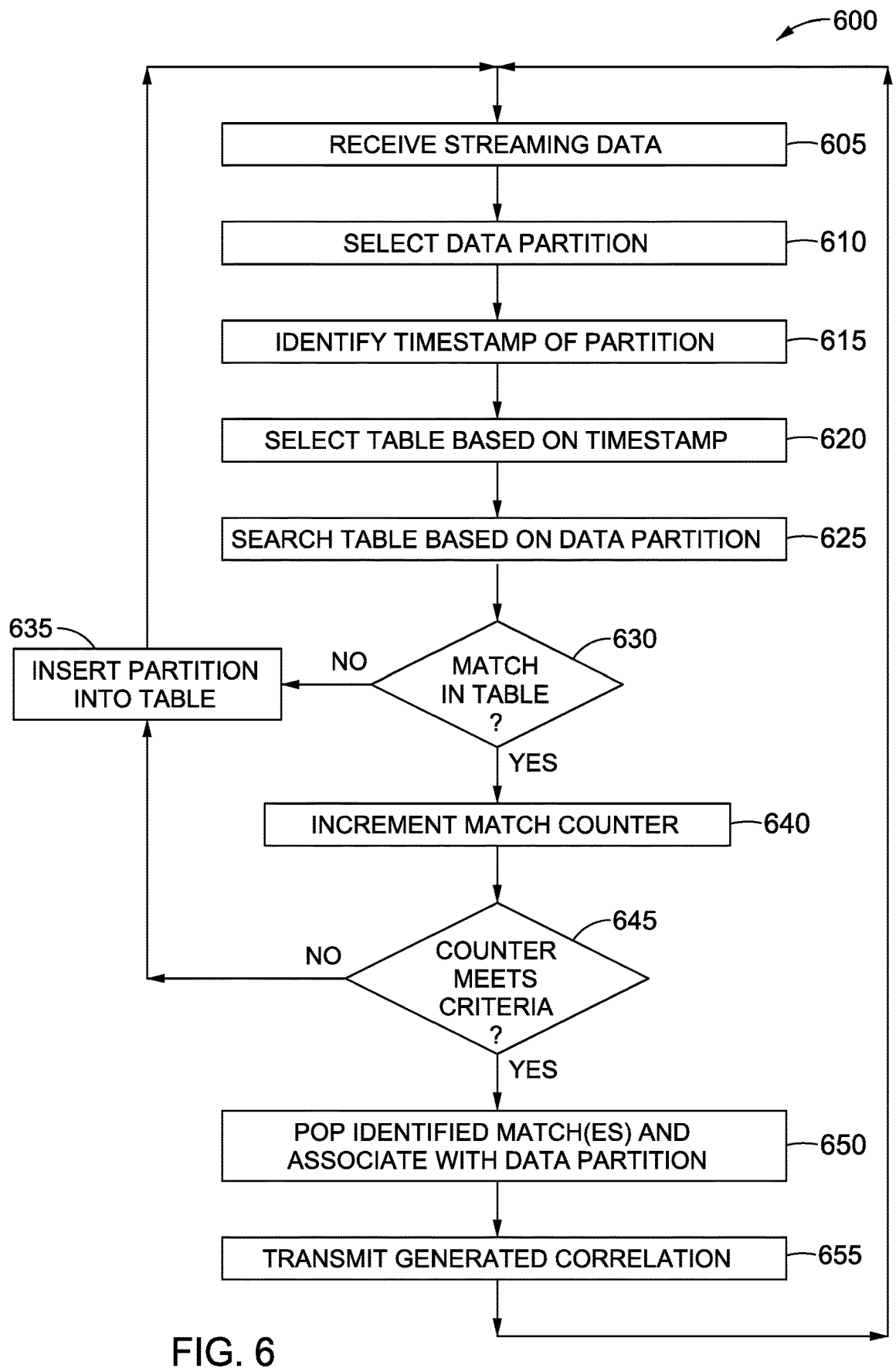
FIG. 6 is a flow diagram illustrating a method for correlating data, according to one embodiment disclosed herein.

FIG. 6 is a flow diagram illustrating a method 600 for correlating data, according to one embodiment disclosed herein. The illustrated method 600 begins at block 605, where a Correlation Engine 130 receives streaming data. As discussed above, this data may be a telemetry stream, a stream of sensor data, a stream of records, or any other data. The method 600 proceeds to block 610, where the Pre-Processing Component 135 selects a data partition from data stream. In one embodiment, this partitioning is based on a logical structure of the data stream. In some embodiments, this partitioning is performed by a pre-processing stage, and the partitions are received sequentially by the Correlation Engine 130.

At block 615, the Buffer Component 140 identifies the timestamp of the selected partition. The method 600 then continues to block 620, where the Buffer Component 140 selects an appropriate hash table for processing the record, based on the timestamp. At block 625, the Buffer Component 140 searches this identified hash table based on the data included in the data partition. For example, as discussed above, in one embodiment, the Buffer Component 140 uses metadata about the data partition, or data about the particular content record, as the key for searching the table. In embodiments, the formulation of the key is determined by a user configuration, based on the desired correlations.

The method 600 then proceeds to block 630, where the Buffer Component 140 determines whether there is a match in the table. That is, as discussed above, the Buffer Component 140 searches the selected hash table based on the generated key, to identify collisions with existing records. If such a collision exists, the Buffer Component 140 determines that the current partition should be correlated with the stored partition. If there is no match, the method 600 proceeds to block 635, where the Buffer Component 140 inserts the partition into the table, and the method 600 returns to block 605 to receive additional streaming data. That is, in an embodiment, the method 600 proceeds to process the next identified partition in the data stream.

If the Buffer Component 140 identifies a correlation in the table, the method 600 continues to block 640, where the Buffer Component 140 increments the match counter associated with the generated key/bucket. Of course, in some embodiments, the Buffer Component 140 may be configured to correlate data between two sources or two types of data. In some embodiments, therefore, a counter is not utilized determine the number of data partitions that have been identified, and the data is immediately removed from the table upon finding a collision. Additionally, in some embodiments, rather than incrementing a counter, the Buffer Component 140 determines the number of data records that are currently stored in the identified hash bucket by other means.

At block 645, the Buffer Component 140 determines whether the match counter meets predefined criteria (e.g., a threshold number of matches). In one embodiment, a user or administrator defines the criteria based on the number of data records that are to be correlated. As discussed above, in various embodiments, different data sources, different types of data, and the like, may be correlated. The criteria may be defined such that the data is removed from the Ring Buffer 215 only once the predefined number of correlations or matches have been identified. If this criteria is not satisfied, the method 600 proceeds to block 635, where the data is inserted into the identified table at the identified location. The method 600 then returns to block 605, to continue receiving data.

If, however, the Buffer Component 140 determines that the criteria is satisfied, the method 600 proceeds to block 650, where the Buffer Component 140 removes the identified match(es) from the hash table, and associates all of the data with the current partition. This association may be achieved by linking the records, including an indication as to the association, storing or transmitting the records in a single data structure, or any other suitable technique for identifying the correlation. The method 600 then proceeds to block 655, where the Correlation Engine 130 transmits the correlation to the downstream operator. As discussed above, in embodiments, this may include one or more additional correlation engines, a database, an application, and the like.

Figure 7:
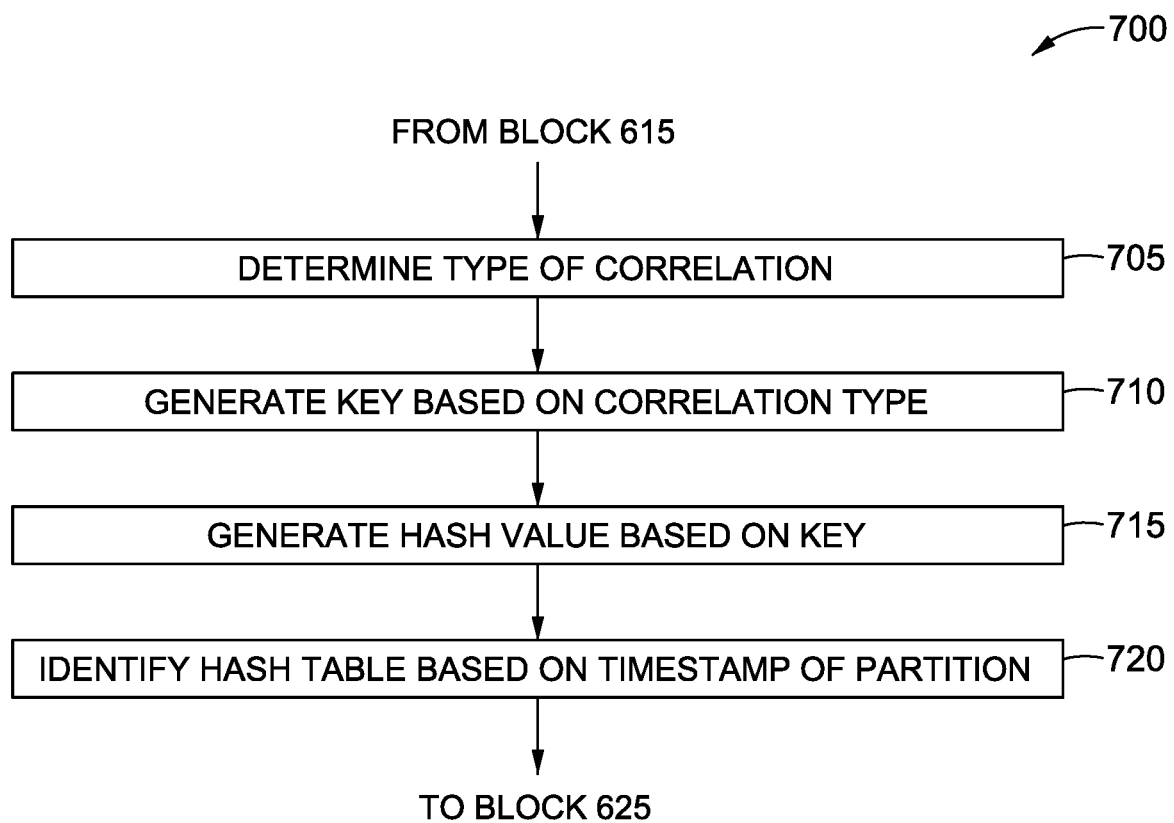
FIG. 7 is a flow diagram illustrating a method for determining data correlations, according to one embodiment disclosed herein.

FIG. 7 is a flow diagram illustrating a method 700 for determining data correlations, according to one embodiment disclosed herein. In one embodiment, the method 700 provides additional detail for block 620 in FIG. 6. The method 700 begins after the partition's timestamp has been identified in block 615. At block 705, the Buffer Component 140 determines the desired type of correlation. As discussed above, this may be defined by an administrator, in order to ensure the Correlation Engine 130 serves the purpose for which it is intended. For example, in embodiments, the desired correlation may be with respect to the 5-tuple of the record, the switch, port, interface, and/or queue associated with the record, and the like. Additionally, in embodiments, the correlation may be with respect to the sensor or device which transmitted the data, the type of data included in the data stream, and the like. The examples given herein are not intended to be limiting, and additional data correlations will be apparent to one of skill in the art.

Once the desired correlation has been determined, the method 700 continues to block 710, where the Buffer Component 140 generates a hash key for the partition based on this correlation. For example, in an embodiment utilizing the 5-tuple of a data packet, generating the hash key may comprise concatenating each value in the 5-tuple into a single value. In some embodiments, the 5-tuple may itself act as the key. Generally, in embodiments, generating the hash key comprises identifying data that is to be used to match or correlate records, extracting this data from the data partition (or from metadata associated with the partition), and formatting it for use with a hash algorithm, as defined in a configuration associated with the correlation engine. At block 715, the Buffer Component 140 generates the corresponding hash value for this key. The hash value can be generated using any suitable hash algorithm. The method 700 then proceeds to block 720, where the Buffer Component 140 identifies the appropriate hash table, based on the timestamp of the partition.

For example, as discussed above, in an embodiment, the Buffer Component 140 utilizes a Ring Buffer 215 of Data Elements 220, each of which include a pointer to a distinct Hash Table 145. Further, in an embodiment, each Data Element 220 includes data for a defined window of time. In such an embodiment, identifying the appropriate hash table comprises determining which Data Element 220 corresponds to the timestamp of the record, and selecting the associated Hash Table 145. The method 700 then terminates, and the hash value is used in block 625 to search the selected table.

Figure 8:
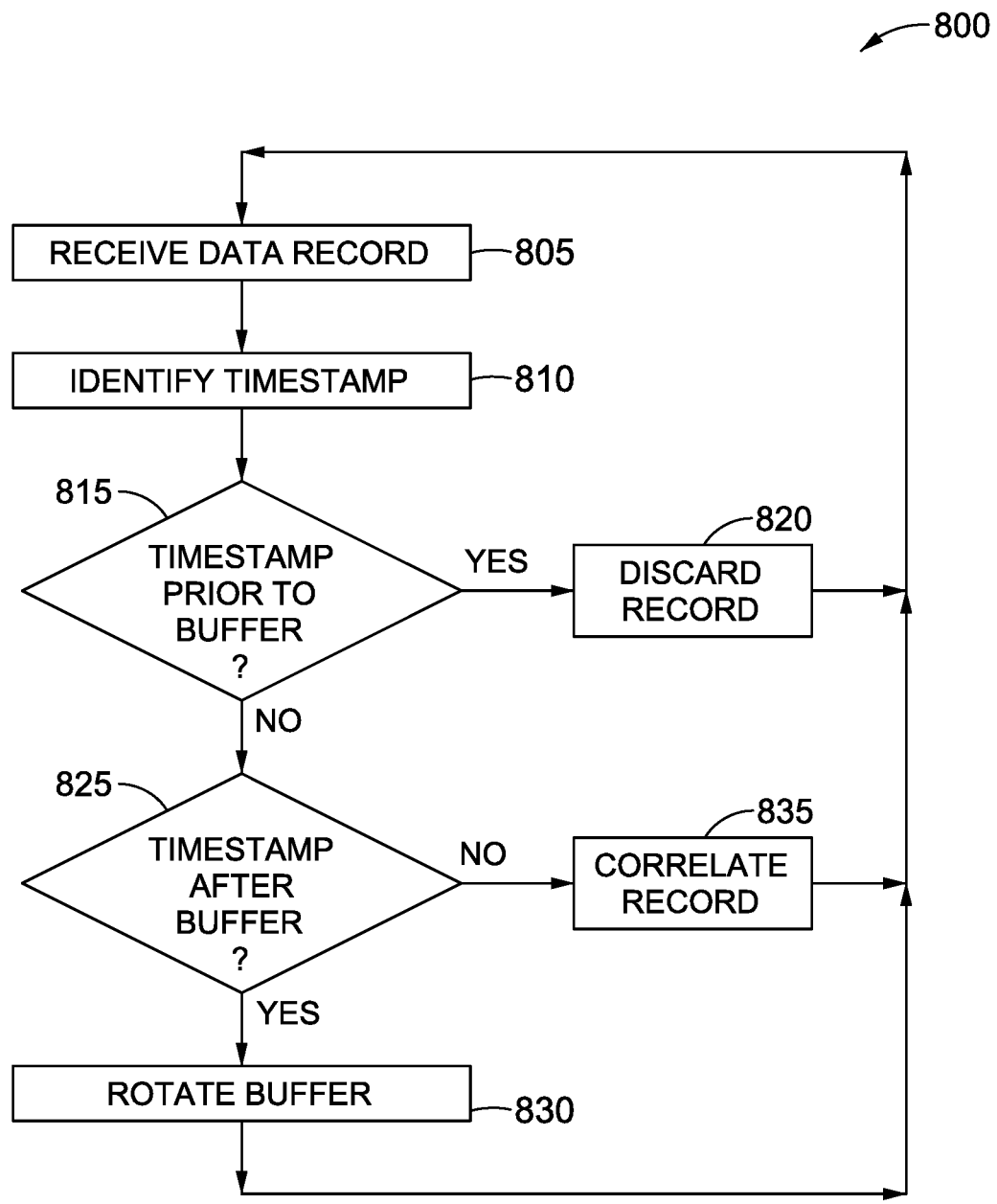
FIG. 8 is a flow diagram illustrating a method for correlating data using a ring buffer, according to one embodiment disclosed herein.

FIG. 8 is a flow diagram illustrating a method 800 for correlating data using a ring buffer, according to one embodiment disclosed herein. In one embodiment, the method 800 is performed alongside the method 600. That is, in an embodiment, for each record or partition processed via the method 600, the method 800 is also performed. In the illustrated embodiment, the method 800 begins at block 805, where the Buffer Component 140 receives a data record. At block 810, the Buffer Component 140 identifies the timestamp of the record. The method 800 then continues to block 815, where the Buffer Component 140 determines whether the timestamp is earlier than the data included within the Ring Buffer 215.

In an embodiment, determining whether the timestamp is prior to the Ring Buffer 215 is based on the location of a buffer marker or pointer, as well as the total wheel rotation time. For example, suppose the most recent Data Element 220 M ends with t=50, and the Ring Buffer 215 includes ten entries, each spanning one second. In such an embodiment, the Ring Buffer 215 spans 10 seconds of data. Thus, the total wheel rotation time is ten seconds, and the buffer only includes data that is newer than t=40. Thus, if the timestamp of the current record is smaller than t=40 (e.g., t=35), the record falls outside of the buffer.

If the timestamp is prior to the width of the Ring Buffer 215, the method 800 continues to block 820, where the record is discarded. The method 800 then returns to block 805. If the timestamp is not prior to the end of the buffer, the method 800 continues to block 825, where the Buffer Component 140 determines whether the timestamp occurs after the buffer. That is, the Buffer Component 140 determines whether the timestamp of the current record or partition is more recent than the most recent window in the Ring Buffer 215. Continuing the above example, if the timestamp is greater than t=50, the record is newer than the Ring Buffer 215 allows.

If the timestamp occurs after the window covered by the newest Data Element 220, the method 800 continues to block 830, where the Buffer Component 140 rotates the buffer by one Data Element 220. That is, the Buffer Component 140 moves the marker forward in time by one Data Element 220, clears the Hash Table 145 that resides in that element, and creates a new Hash Table 145. The method 800 then continues to block 835. Additionally, if, at block 825, the Buffer Component 140 determines that the timestamp is not ahead of the buffer, the method continues to block 835. That is, continuing the above example, if the timestamp falls between 40 and 50, the Buffer Component 140 determines that the record falls somewhere in the Ring Buffer 215.

At block 835, the Buffer Component 140 correlates the selected partition or record. For example, in one embodiment, the Buffer Component 140 performs the method 600 to either insert the record or identify a match in the Hash Table 145, as discussed above. In this way, the Ring Buffer 215 is kept up-to-date, and older data that has yet to be correlated is discarded. In some embodiments, rather than discarding the data in the oldest Data Element 220, the Buffer Component 140 pops any records in each hash bucket, links them together, and transmits them downstream as a partial correlation. In one embodiment, if only a single data record is included in a particular hash entry, the record is discarded.

Figure 9:
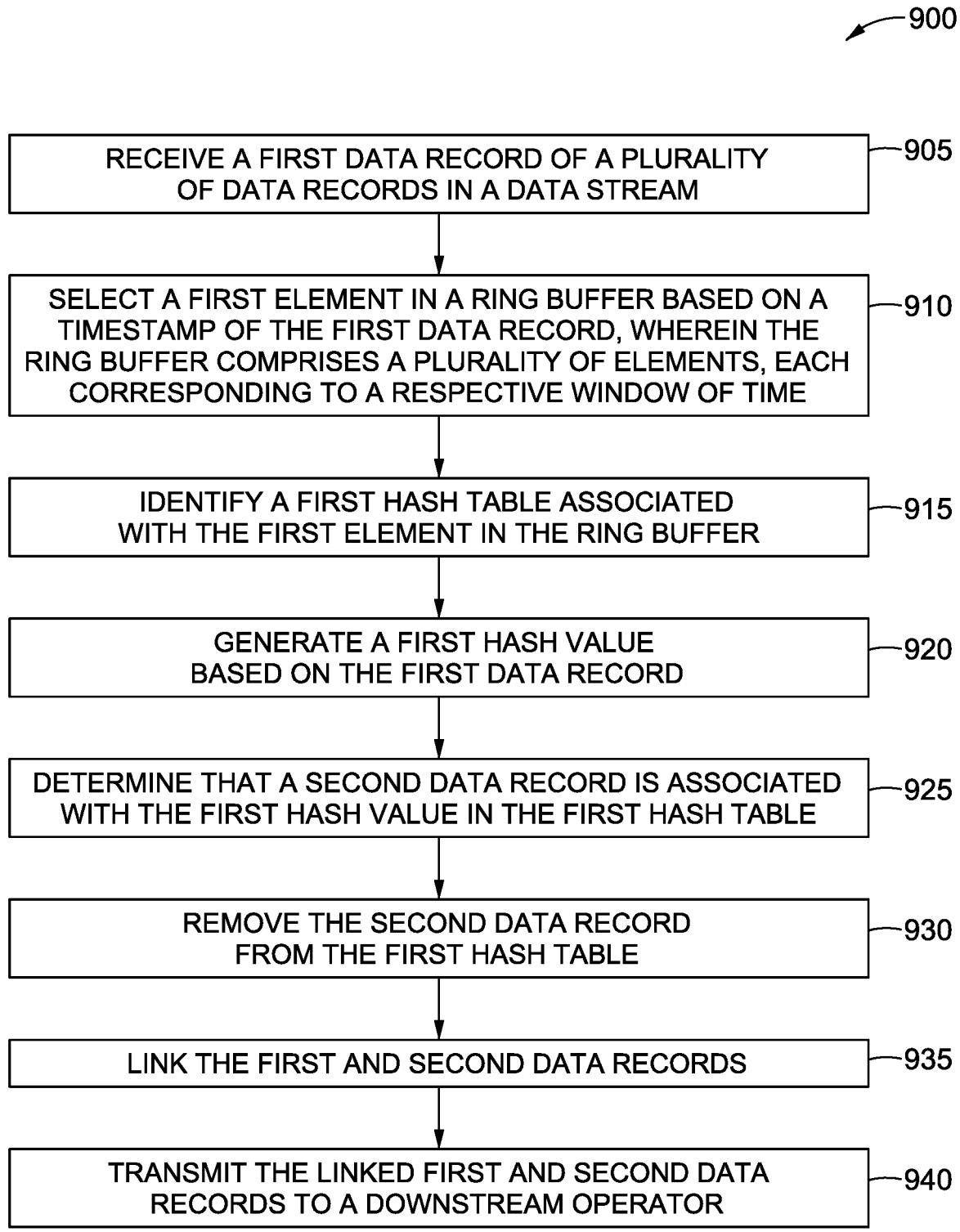
FIG. 9 is a flow diagram illustrating a method for correlating data partitions, according to one embodiment disclosed herein.

FIG. 9 is a flow diagram illustrating a method 900 for correlating data partitions, according to one embodiment disclosed herein. The method 900 begins at block 905, where a Correlation Engine 130 receives a first data record of a plurality of data records in a data stream. At block 910, the Correlation Engine 130 selects a first element in a ring buffer based on a timestamp of the first data record, wherein the ring buffer comprises a plurality of elements, each corresponding to a respective window of time. The method 900 then continues to block 915, where the Correlation Engine 130 identifies a first hash table associated with the first element in the ring buffer. At block 920, the Correlation Engine 130 generates a first hash value based on the first data record. The method 900 then proceeds to block 925, where the Correlation Engine 130 determines that a second data record is associated with the first hash value in the first hash table. At block 930, the Correlation Engine 130 removes the second data record from the first hash table. Additionally, at block 935, the Correlation Engine 130 links the first and second data records. Finally, the method 900 proceeds to block 940, where the Correlation Engine 130 transmits the linked first and second data records to a downstream operator.

Figure 10:
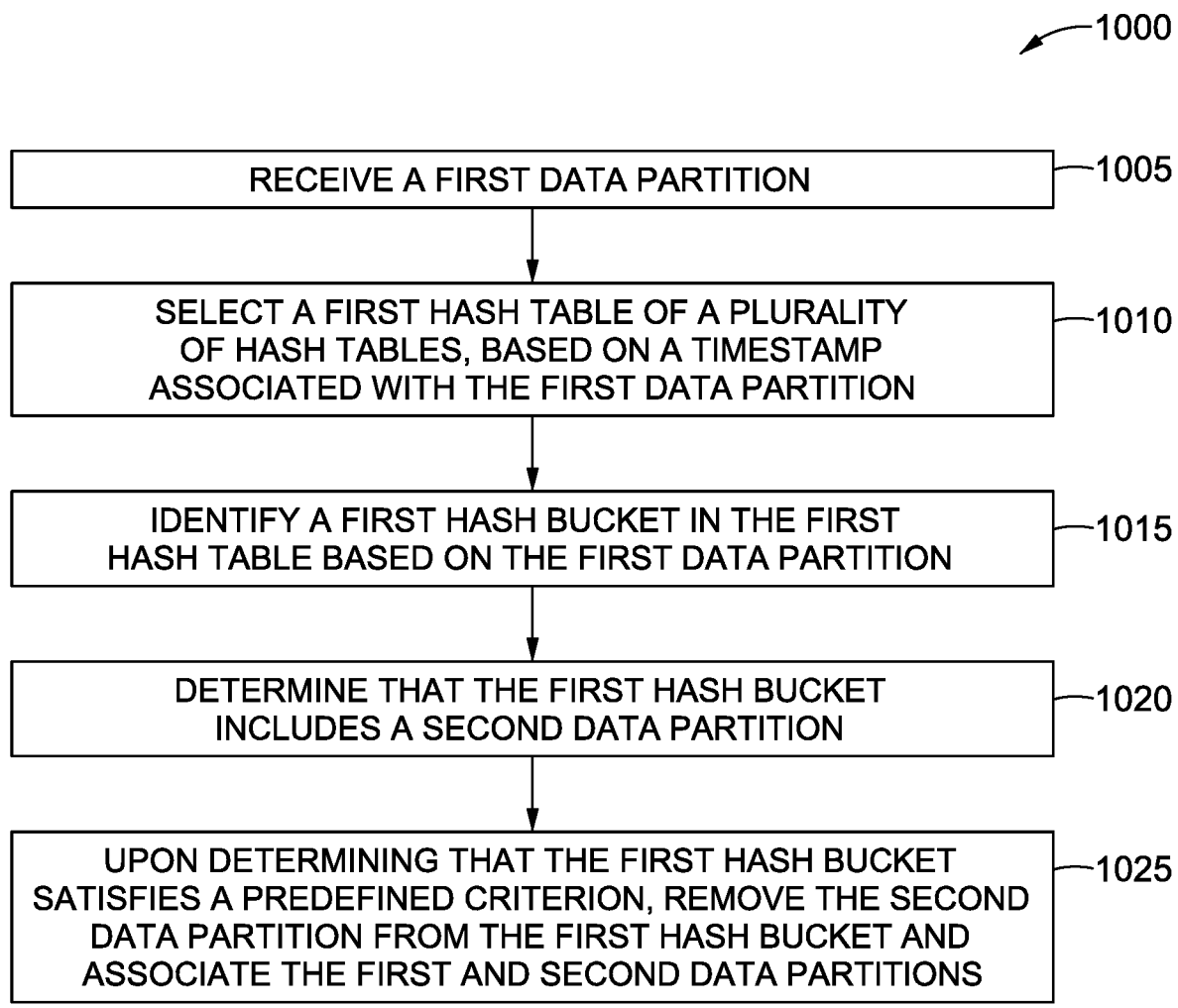
FIG. 10 is a flow diagram illustrating a method for correlating data partitions, according to one embodiment disclosed herein.

FIG. 10 is a flow diagram illustrating a method 1000 for correlating data partitions, according to one embodiment disclosed herein. The method 1000 begins at block 1005, where a Correlation Engine 130 receives a first data partition. The method 1000 then proceeds to block 1010, where the Correlation Engine 130 selects a first hash table of a plurality of hash tables based on a timestamp associated with the first data partition. At block 1015, the Correlation Engine 130 identifies a first hash bucket in the first hash table based on the first data partition. Additionally, at block 1020, the Correlation Engine 130 determines that the first hash bucket includes a second data partition. The method 1000 then continues to block 1020, where, upon determining that the first hash bucket satisfies a predefined criterion, the Correlation Engine 130 removes the second data partition from the first hash bucket and associates the first and second data partitions.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., Correlation Engines 130) or related data available in the cloud. For example, the Correlation Engines 130 could execute on a computing system in the cloud and process data in the cloud. In such a case, the Correlation Engine 130 could correlate streaming data in real time in the cloud, and store such identified correlations at a storage location in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
receiving a first data record of a plurality of data records in a data stream;
selecting a first element in a ring buffer based on a timestamp of the first data record, wherein the ring buffer comprises a plurality of elements, each corresponding to a respective window of time;
identifying a first hash table associated with the first element in the ring buffer;
generating a first hash value based on the first data record; and
upon determining that a second data record is already associated with the first hash value in the first hash table:
  removing the second data record from the first hash table;
  linking the first and second data records; and
  transmitting the linked first and second data records to a downstream operator.

2. The method of claim 1, the method further comprising:
receiving a third data record; and
upon determining that a timestamp associated with the third data record is newer than a predefined threshold:
  selecting a second element in the ring buffer, wherein the second element corresponds to an oldest window of time of the respective windows of time;
  identifying a second hash table associated with the second element; and
  discarding the second hash table.

3. The method of claim 1, wherein removing the second data record from the first hash table, linking the first and second data records, and transmitting the linked first and second data records to the downstream operator are performed upon further determining that a predefined criterion is satisfied.

4. The method of claim 3, wherein determining that the predefined criterion is satisfied comprises determining that a number of data records associated with the first hash value in the first hash table exceeds a predefined threshold.

5. The method of claim 1, the method further comprising:
receiving a third data record;
generating a second hash value, based on the third data record;
determining, based on the first hash value, a number of data records associated with the second hash value in the first hash table does not exceed a predefined threshold; and
inserting the third data record into the first hash table.

6. The method of claim 1, the method further comprising:
receiving a third data record; and
upon determining that a timestamp associated with the third data record is older than a predefined threshold, discarding the third data record.

7. A computer program product comprising:
a computer-readable storage medium having computer-readable program code embodied therewith, the computer-readable program code executable by one or more computer processors to perform an operation comprising:

receiving a first data partition;

selecting a first hash table of a plurality of hash tables based on a timestamp associated with the first data partition;

identifying a first hash bucket in the first hash table based on the first data partition;

determining that the first hash bucket includes a second data partition; and upon determining that the first hash bucket satisfies a predefined criterion based on determining that a threshold number of data partitions are stored in the first hash bucket:

removing the second data partition from the first hash bucket; and associating the first and second data partitions.

8. The computer program product of claim 7, the operation further comprising transmitting the first and second data partitions to one or more data sinks.

9. The computer program product of claim 7, wherein receiving a first data partition comprises:

receiving a data stream, wherein the data stream includes a plurality of logical units of data; and portioning the data stream into a plurality of data partitions, based on the plurality of logical units of data.

10. The computer program product of claim 7, wherein selecting the first hash table of the plurality of hash tables comprises identifying a first element in a ring buffer containing a plurality of elements, wherein each of the plurality of elements is associated with a respective hash table of the plurality of hash tables.

11. The computer program product of claim 10, wherein each respective element of the plurality of elements is associated with a respective window of time.

12. The computer program product of claim 11, the operation further comprising:

receiving a third data partition; and upon determining that a timestamp associated with the third data partition is newer than a predefined threshold:

selecting a second hash table of the plurality of hash tables, wherein the second hash table is associated with a second data element, wherein the second data element is associated with an oldest window of time of the respective windows of time; and discarding the second hash table.

13. The computer program product of claim 7, wherein identifying the first hash bucket in the first hash table comprises:

generating a hash key based on the first data partition, according to a predefined configuration;

generating a hash value based on the hash key; and identifying the first hash bucket based on the generated hash value.

14. The computer program product of claim 7, the operation further comprising:

receiving a third data partition;

identifying a second hash bucket in the first hash table based on the third data partition; and upon determining that the second hash bucket does not satisfy the predefined criterion, inserting the third data partition into the second hash bucket.

15. The computer program product of claim 7, the operation further comprising:

receiving a third data partition; and upon determining that a timestamp associated with the third data partition is older than a predefined threshold, discarding the third data partition.

16. A system comprising:

one or more physical computer processors; and a memory containing a program which when executed by the one or more computer processors performs an operation, the operation comprising:

receiving a first data partition;

selecting a first hash table of a plurality of hash tables based on a timestamp associated with the first data partition;

identifying a first hash bucket in the first hash table based on the first data partition; and upon determining that the first hash bucket does not satisfy a predefined criterion, inserting the first data partition into the first hash bucket.

17. The system of claim 16, wherein selecting the first hash table of the plurality of hash tables comprises identifying a first element in a ring buffer containing a plurality of elements, wherein each of the plurality of elements is associated with a respective hash table of the plurality of hash tables, and wherein each respective element of the plurality of elements is associated with a respective window of time.

18. The system of claim 17, the operation further comprising:

receiving a second data partition; and upon determining that a timestamp associated with the second data partition is newer than a predefined threshold:

selecting a second hash table of the plurality of hash tables, wherein the second hash table is associated with a second data element, wherein the second data element is associated with an oldest window of time of the respective windows of time; and discarding the second hash table.

19. The system of claim 16, the operation further comprising:

receiving a second data partition;

identifying a second hash bucket in the first hash table based on the second data partition;

determining that the second hash bucket includes a third data partition; and upon determining that the second hash bucket satisfies the predefined criterion:

removing the third data partition from the second hash bucket; and associating the second and third data partitions.

* * * * *